United States Patent [19]

Kwon et al.

[11] Patent Number: 5,777,907
[45] Date of Patent: Jul. 7, 1998

[54] PROCESSOR FOR SELECTIVELY PERFORMING MULTIPLICATION/DIVISION

[75] Inventors: Yong Moo Kwon; Hyoung Gon Kim; Jae Hyoung Kim, all of Seoul, Rep. of Korea

[73] Assignee: Korea Institute of Science and Technology, Seoul, Rep. of Korea

[21] Appl. No.: 674,787

[22] Filed: Jul. 3, 1996

[30] Foreign Application Priority Data

Jul. 4, 1995 [KR] Rep. of Korea ............... 1995-19402

[51] Int. Cl.$^6$ .................................................. G06F 7/52
[52] U.S. Cl. ........................................... 364/757; 364/764
[58] Field of Search ........................ 364/716.01, 716.03, 364/736.01, 748.09, 748.1, 754.01, 757, 758, 759, 761, 764, 766

[56] References Cited

U.S. PATENT DOCUMENTS 3,535,498  10/1970  Smith, Jr. ................................. 341/84
4,441,158   4/1984  Kanuma .................................. 364/758
5,270,962  12/1993  Fettweis .................................. 364/766
5,444,647   8/1995  Komoda .................................. 364/761

*Primary Examiner*—Chuong Dinh Ngo
*Attorney, Agent, or Firm*—Oblon, Spivak, McClelland, Maier & Neustadt, P.C.

[57] ABSTRACT

A processor 10 for selectively performing multiplication or division of two inputs comprises a pre-processing unit 20 for modifying the signs of the inputs; an aligning unit 30 for aligning bit positions of the sign-modified inputs; an arithmetic unit 40 for selectively performing multiplication or division of the sign-modified and bit-aligned inputs; a post-processing unit 50 for modifying the signs of outputs from the arithmetic unit; and a control unit 70 for controlling operations of the pre-processing unit, aligning unit, arithmetic unit, and post-processing unit.

6 Claims, 8 Drawing Sheets

DIVIDEND At = a6 a5 a4 a3 a2 a1 a0
DIVISOR  Bt = b3 b2 b1 b0
QUOTIENT Q = q3 q2 aq1 q0
REMAINDER R = r3 r2 r1 r0
CAS : CONTROLLED ADD/SUBTRACT
LSB : LEAST SIGNIFICANT BIT

PROCESSOR FOR SELECTIVELY PERFORMING MULTIPLICATION/DIVISION

BACKGROUND OF THE INVENTION

The present invention generally relates to a processor for performing multiplication or division, and more particularly, to a processor for selectively performing multiplication or division based on a pipeline structure.

In recent years, many sophiscated signal processors are required to be able to efficiently process data in electronic systems wherein the operating speed is critical to the overall performance of the system. Among these electronic systems, multipliers and dividers are commonly used as basic functional blocks. Thus, extensive research has thus far been carried out to improve the structure of the multiplier or divider.

FIGS. 1A–1B represent conventional structures of a multiplier and a divider, respectively. The multiplier shown in FIG. 1A performs the multiplication operation of two inputs, $a_3a_2a_1a_0$ and $b_3b_2b_1b_0$. The multiplier adopts a plurality of full adders "FA" each operating as a basic functional cell. The divider in FIG. 1B performs the two input division operation, i.e., the division of a dividend $a_6a_5a_4a_3a_2a_1a_0$ by a divisor $b_3b_2b_1b_0$, to produce a quotient $q_3q_2q_1q_0$ and a remainder $r_3r_2r_1r_0$. The divider also adopts a plurality of controlled add/subtract modules "CAS" each operating as a basic functional cell as shown in FIG. 1C. As illustrated in FIGS. 1A and 1B, the conventional scheme has the disadvantages that hardware should be separately constructed to perform multiplication and division, and that cascaded carry propagation delays reduce processing speed, thereby reducing the overall system performance.

Thus, there has been a long felt need in the art for a processor for selectively performing multiplication or division at high speed.

SUMMARY OF THE INVENTION

It is therefore an object of the present invention to provide a processor for selectively performing multiplication or division at high speed based on a pipeline structure.

According to one aspect of the present invention, a processor for selectively performing multiplication or division of two inputs is provided which comprises pre-processing means for modifying the signs of said inputs; aligning means for aligning bit positions of said sign-modified inputs; arithmetic means for selectively performing multiplication or division of said sign-modified and bit-aligned inputs; post-processing means for modifying the signs of outputs from said arithmetic means; and control means for controlling operations of said pre-processing means, aligning means, arithmetic means, and post-processing means.

According to one embodiment of the invention, the pre-processing means comprises: a first sign modifier for selecting a first input out of two inputs and producing a first predata which is the absolute value of said first input, and a second sign modifier for selecting a second input out of two inputs and producing a second predata which is either the absolute value of said second input when performing multiplication or the negative of absolute value of said second input when performing division, and said control means informing said second sign modifier of the type of operation being performed.

According to another embodiment of the invention, the aligning means comprises: a first multiplexer that selects either said first predata when performing multiplication or a bit sequence of logical ones (1's) when performing division, to produce a pre-sequence; a plurality of gate portions for carrying out logical AND between said second predata and each bit of said pre-sequence respectively, to produce a plurality of post-sequences; and a plurality of stand-by registers for storing said post-sequences in predetermined aligning order, wherein each of the gate portions corresponds to each of the stand-by registers.

According to still another embodiment of the invention, said aligning means further comprises a plurality of second multiplexers for selecting either logical zero (0) when performing multiplication or logical one (1) when performing division, each of said post-sequence being aligned in the corresponding stand-by filled bits of the stand-by registers being filled with logical zero (0), while each unfilled bit higher in order than the filled bits of the stand-by registers being filled with a bit selected by said second multiplexer, and said control means informing said second multiplexer of the type of operation being performed.

According to yet another embodiment of the invention, the arithmetic means comprises: a series of M/D modules, each having corresponding order and comprising: a two-input adder having a first terminal and a second terminal for producing the sum of the values supplied in said terminals, wherein said second terminal is supplied with the value stored in the stand-by register corresponding to the associated M/D module, and a third multiplexer for selecting either said sum when performing multiplication, or one of said sum and the value in said first terminal depending on the sign of said sum when performing division, wherein the highest in order M/D module is provided with said first predata and the value stored in the stand-by register associated with the MSB of said pre-sequence, and operation result of an M/D module except the highest in order M/D module is provided to the first terminal of said two-input adder of next lower in order M/D module; a plurality of delay means for delaying inputs and outputs of said series of M/D modules for predetermined time periods; and a fourth multiplexer for selecting either the output of said highest in order M/D module when performing multiplication or value stored in the stand-by register associated with the MSB of said pre-sequence when performing division and providing said selected output to the first terminal of the adder of the secondly highest in order M/D module.

According to another embodiment of the invention, the post-processing means comprises two sign modifiers for modifying the signs of the outputs from said arithmetic means depending the signs of the plurality of inputs.

BRIEF DESCRIPTION OF THE DRAWINGS

The aforementioned aspects and other features of the invention will be apparent from the following description, taken in conjunction with the accompanying drawings, wherein the same reference numerals are used to identify like or similar functional elements and in which.

DESCRIPTION OF A PREFERRED EMBODIMENT

Figure 1A:
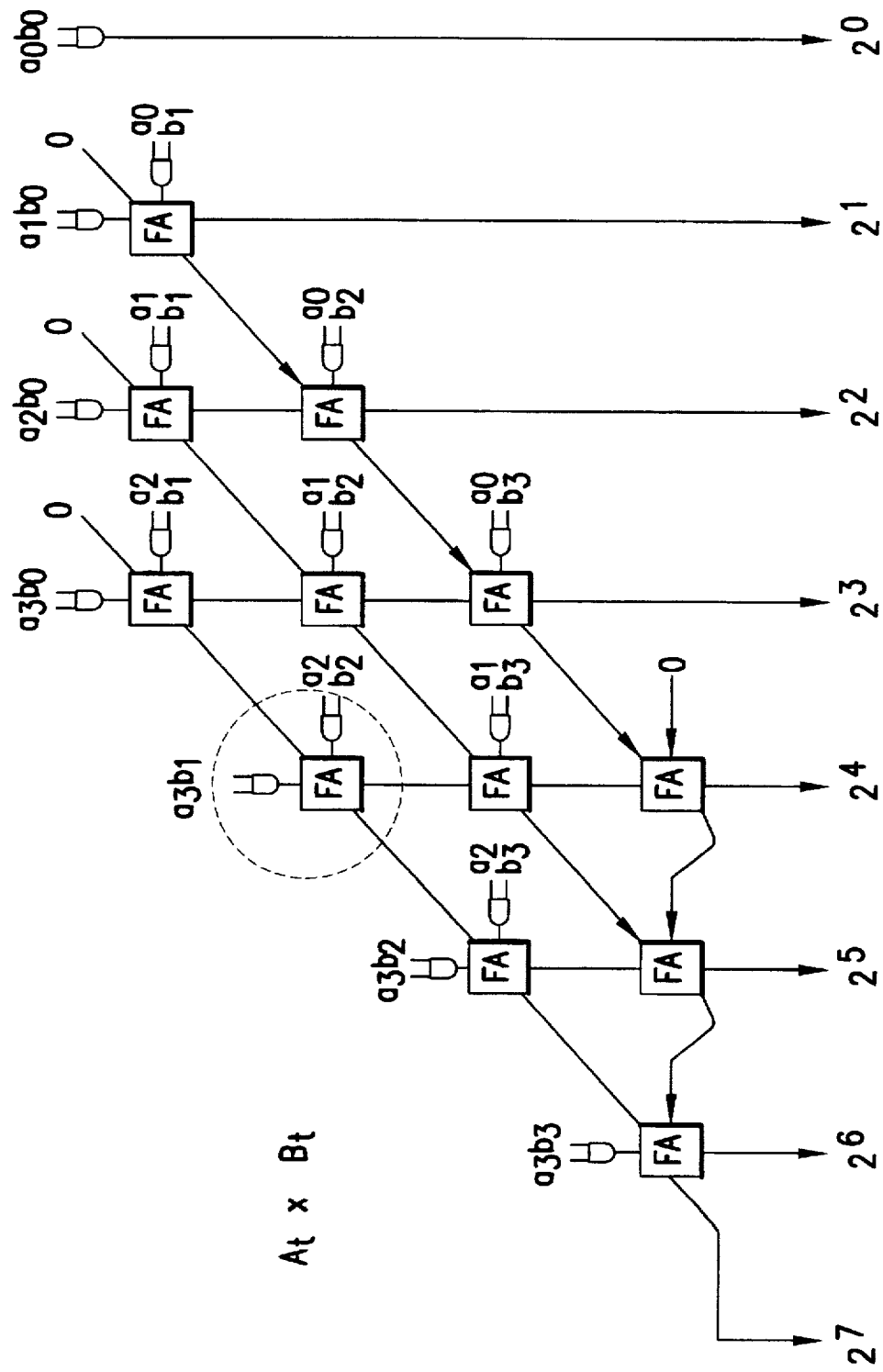
FIGS. 1A–1B are diagrams illustrating conventional structures of a multiplier and a divider, respectively.
Figure 1B:
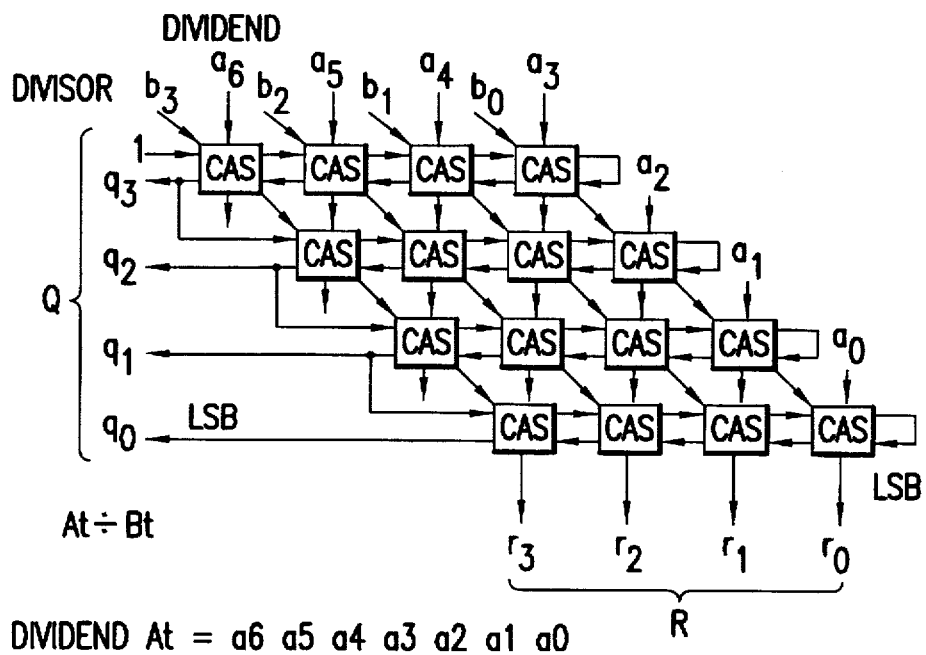
Figure 1C:
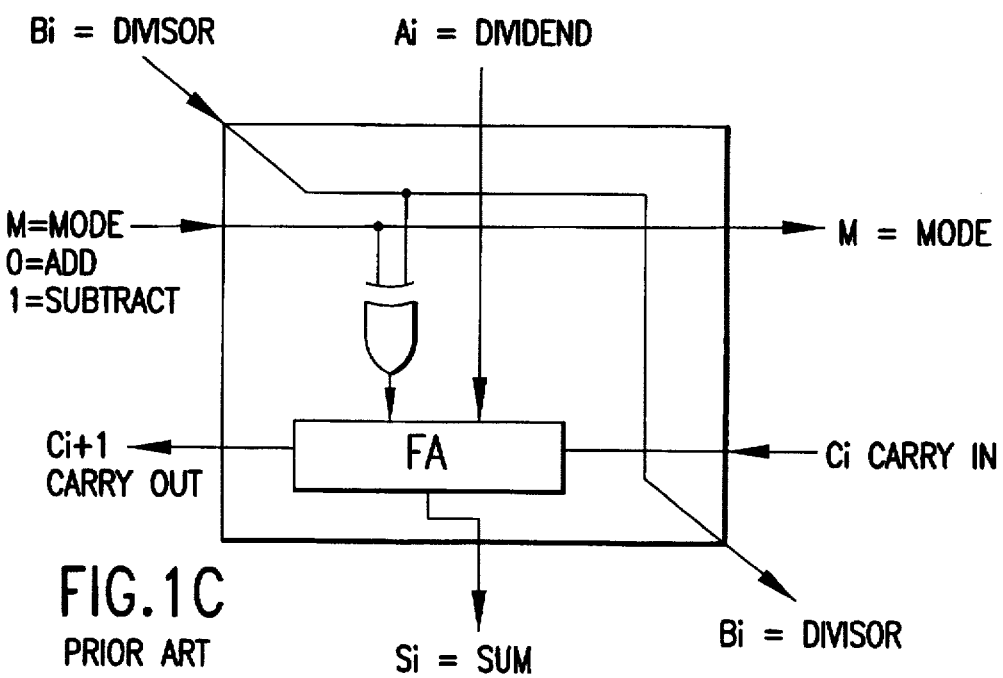
FIG. 1C is a schematic representation of a functional unit "CAS" of the divider of FIG. 1B.
Figure 2:
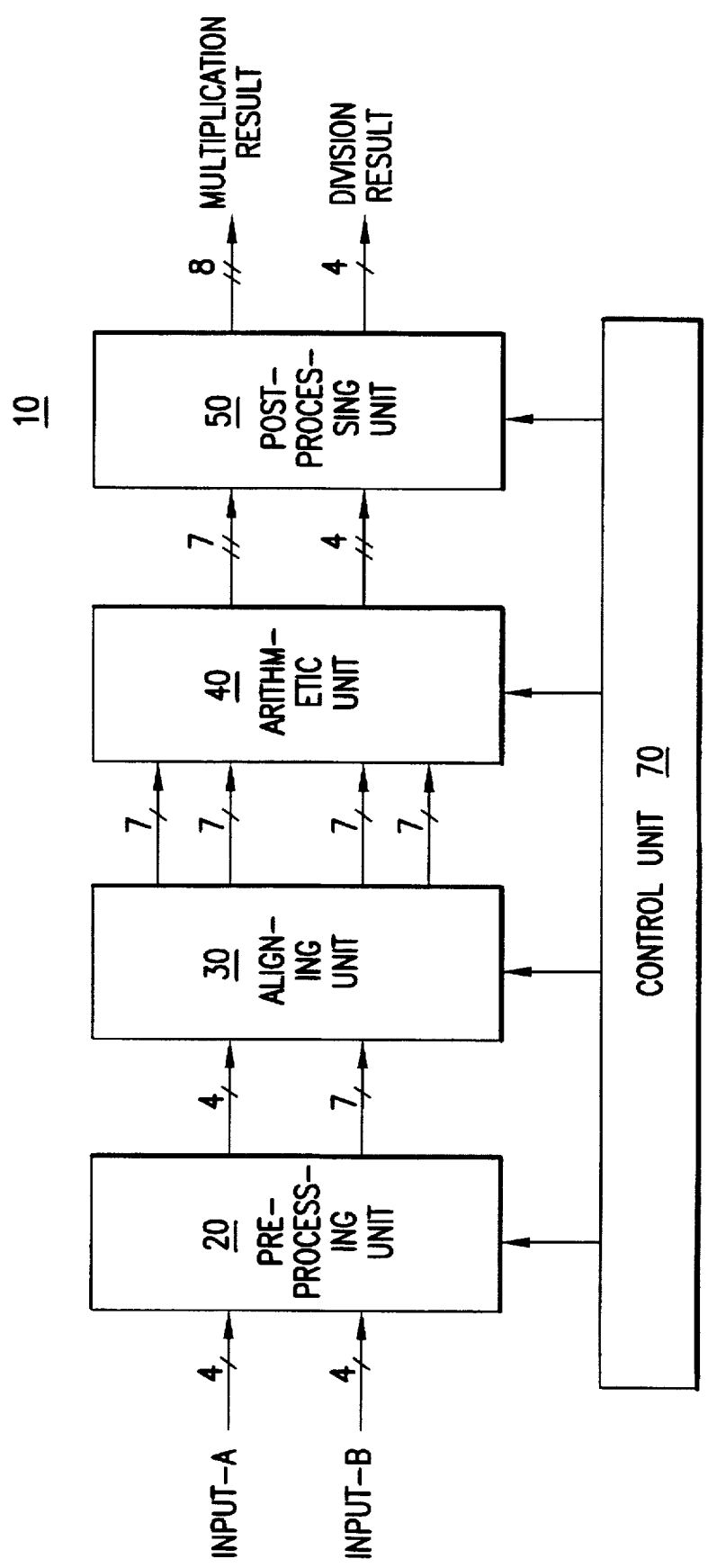
FIG. 2 is a block diagram of a processor in accordance with the preferred embodiment of the present invention.

FIG. 2 is a block diagram illustrating the overall structure of a processor 10 of the present invention. The processor 10 generally includes a pre-processing unit 20, an aligning unit 30, an arithmetic unit 40, a post-processing unit 50, and a control unit 70.

The pre-processing unit 20 modifies signs of inputs to the processor 10. The aligning unit 30 then receives the sign-modified inputs from the pre-processing unit 20 to align the bit positions of the sign-modified inputs for arithmetic processing. The arithmetic unit 40 then receives the bit-aligned results from the aligning unit 30 and selectively performs multiplication or division operations between the sign-modified and bit-aligned inputs. The post-processing unit 50 then modifies signs of the arithmetic results. The control unit 70 controls operations of the pre-processing unit 20, aligning unit 30, arithmetic unit 40, and post-processing unit 50.

As shown in FIG. 2, the processor 10 has two inputs Input-A, Input-B. The processor 10 selectively performs multiplication or division between Input-A and Input-B based on a pipeline structure. As can be seen in the bit numbers marked on signal lines, the ranges of the inputs are within −8 to +7, thus the inputs can be represented by 4 bits in the embodiment. The range of the result of multiplication is within −56 to +64 to be represented by 8 bits, and that of division is within −8 to +7 to be represented by 4 bits. However, the structure of the present invention is not restricted by the above, but may be generalized and adapted to any processing systems irrespective of the length of input and output bits.

Figure 3A:
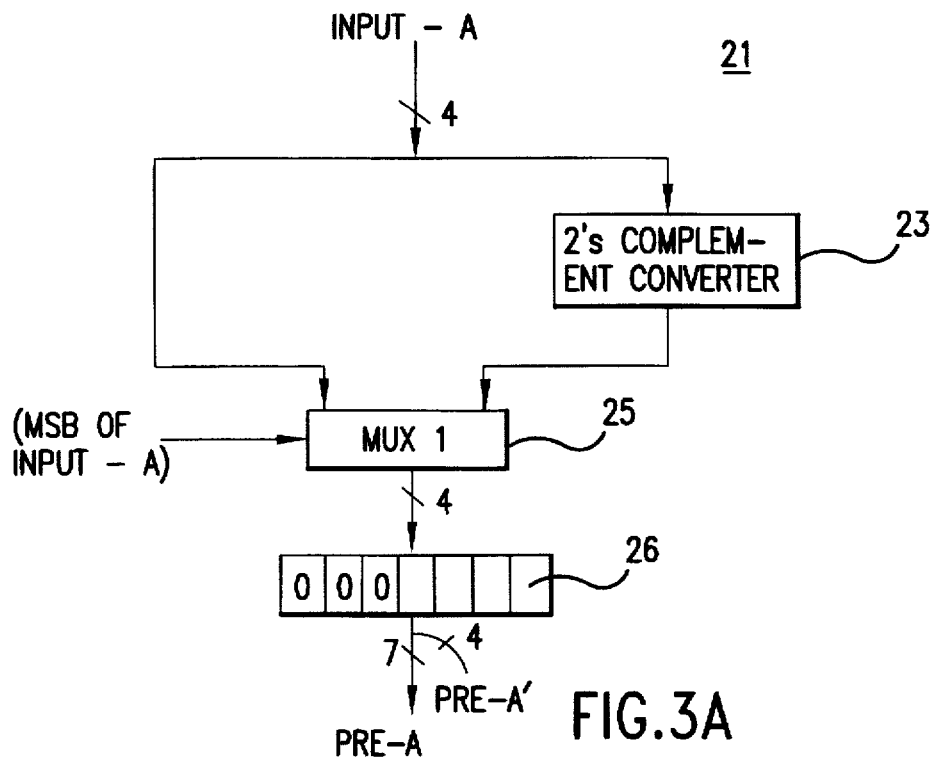
FIGS. 3A–3B are schematic representations illustrating a first and a second sign modifiers included in a pre-processing means in accordance with the preferred embodiment of the present invention.
Figure 3B:
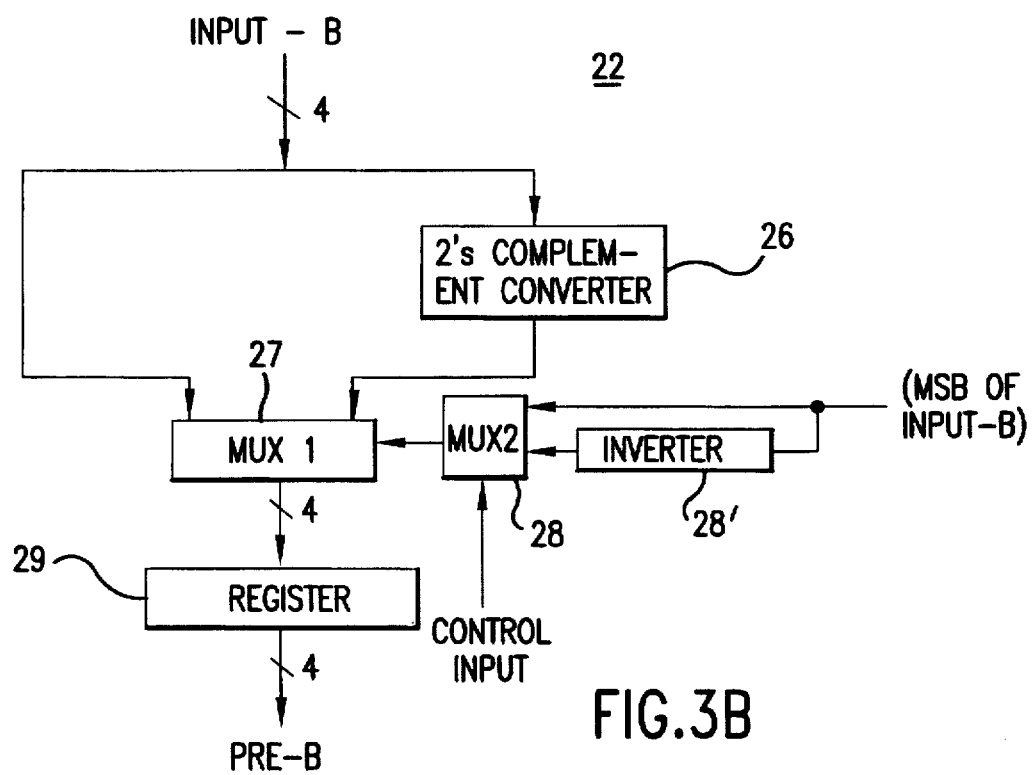

According to one embodiment of the invention, the pre-processing unit 20 comprises a first sign modifier 21 and a second sign modifier 22 for modifying the signs of the inputs Input-A, Input-B to the processor 10. The first sign modifier 21 and the second sign modifier 22 are illustrated in FIGS. 3A and 3B, respectively.

The operations of the first sign modifier 21 will be described with reference to FIG. 3A. The first sign modifier 21 selects Input-A and produces the absolute value of Input-A.

The first sign modifier 21 comprises a two's complement converter 23, a MUX1 25, and a register 26. The two's complement converter 23 converts Input-A into its two's complement. The MUX1 25 selects either Input-A or its two's complement depending on the MSB of Input-A, i.e. the sign of Input-A. That is, the MUX1 25 selects Input-A when the MSB is logical zero (0), and selects the two's complement of Input-A when the MSB is logical one (1). The selection output of MUX1 25 is stored in the register 26.

In this embodiment, the register 26 provides more rooms than required by the length of the selection output. The selection output of the MUX1 25 is stored in the lower locations (i.e., the less significant locations) and remaining locations of the register 26 are filled with logical zeros (0's). The data stored in the lower locations of the register 26 is labeled as pre-A', and the overall data stored in the register 26 is labeled as pre-A.

Thus, the first sign modifier 21 outputs Input-A unchanged when Input-A is non-negative whereas the modifier 21 outputs the two's complement of Input-A when Input-A is negative.

The operations of the second sign modifier 22 will now be described with reference to FIG. 3B. The second sign modifier 22 selects Input-B and produces either the absolute value of Input-B or the negative of the absolute value of Input-B depending on the type of operation being performed by the processor 10.

The second sign modifier 22 comprises a two's complement converter 26, a MUX1 27, a MUX2 28, an inverter 28', and a register 29. The two's complement converter 26 converts Input-B into its two's complement. The MUX1 27 selects either the Input-B or its two's complement depending on the MSB of Input-B and the type of operation being performed. MUX2 28 selects either the MSB of Input-B or its inverted value depending on the control input from the control unit 70, and supplies the selection output for the MUX1 27. In this embodiment, when performing multiplication, the MUX2 28 selects the MSB of Input-B, and the MUX1 27 selects Input-B when the MSB is logical zero (0) and selects the two's complement of Input-B when the MSB is logical one (1). On the other hand, when performing division, the MUX2 28 selects the inverted value of the MSB of Input-B, and MUX1 27 selects Input-B when the MSB is logical one (1) and selects the two's complement of Input-B when the MSB is logical zero (0). The selection output of the MUX1 27 is stored in the register 29. The data stored in the register 29 is labeled as pre-B.

Thus, when performing multiplication, the second sign modifier 22 outputs Input-B unchanged if Input-B is non-negative, while it outputs its two's complement if Input-B is negative. When performing division, the second sign modifier 22 outputs Input-B unchanged if Input-B is negative, while it outputs its two's complement if Input-B is non-negative.

Figure 4:
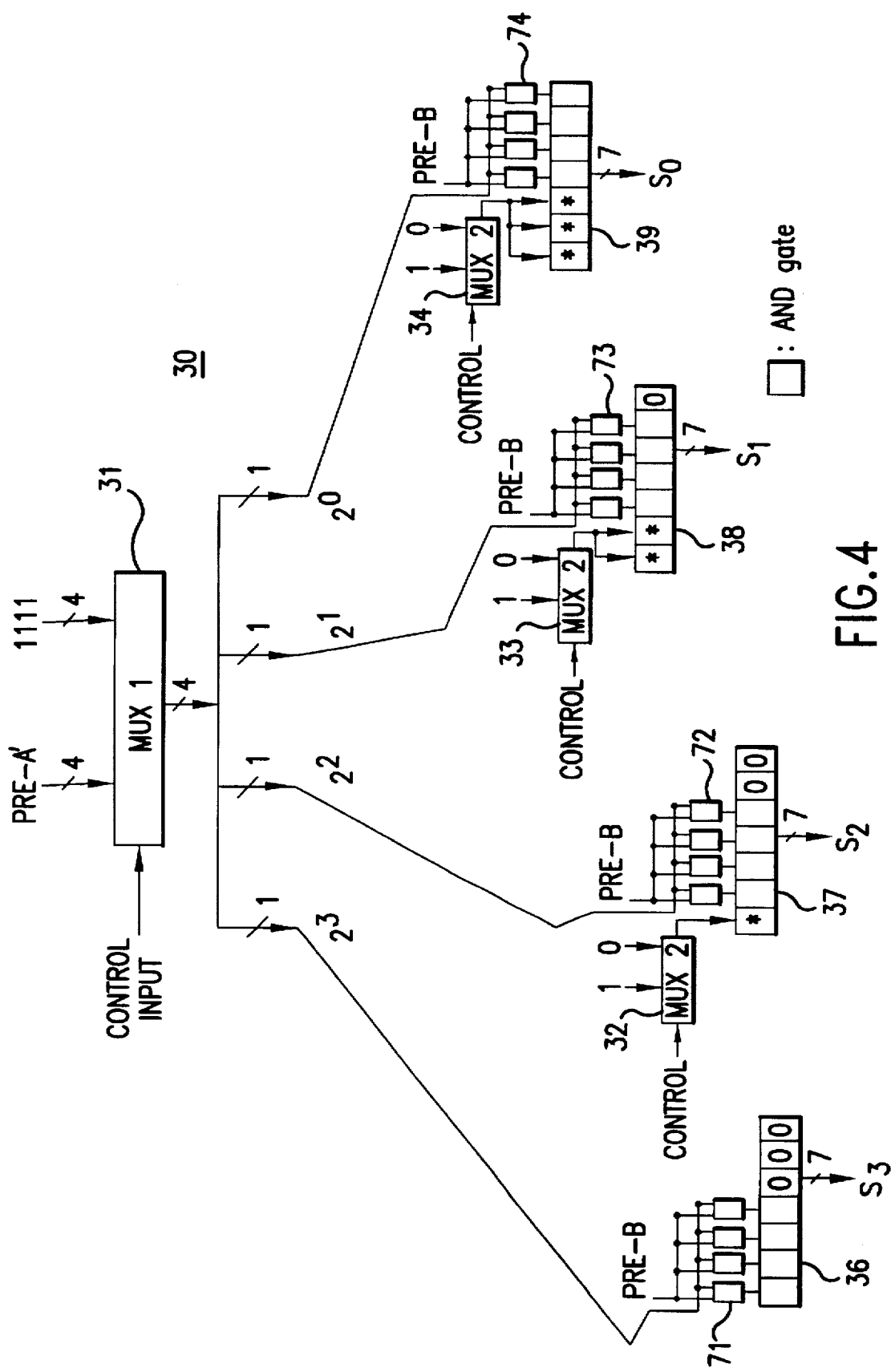
FIG. 4 is a detailed representation of an aligning unit in accordance with the preferred embodiment of the present invention.

FIG. 4 is a detailed representation of the aligning unit 30 in accordance with the preferred embodiment of the present invention. The aligning unit 30 comprises a MUX1 31, a plurality of MUX2 32, 33, 34, a plurality of gate portions 71, 72, 73, 74, and a plurality of stand-by registers 36, 37, 38, 39.

The MUX1 31 selects either the pre-A' from the first sign modifier 21 or a bit sequence of logical ones (1's) depending on the control input from the control unit 70, to produce a pre-sequence. The control input includes information on the type of operation being performed. In the embodiment, the MUX1 31 selects the pre-A' when performing multiplication, while it selects the bit sequence of logical ones (1's) when performing division.

All bits of the pre-sequence are supplied to the plurality of gate portions 71, 72, 73, 74, respectively. Each gate portion comprises a plurality of AND gates. The number of AND gates in the gate portion is not less than the bit-length of pre-B from the second sign modifier 22. Each gate portion performs logical AND between the corresponding bit of the pre-sequence and pre-B to produce a post-sequence. The post-sequences from the plurality of gate portions 71, 72, 73, 74 are respectively stored in the plurality of stand-by registers 36, 37, 38, 39 in a predetermined aligning order.

The predetermined aligning order for storing any post-sequence in a stand-by register will be described. A portion of the stand-by register is filled with the post-sequence. The bit location in the stand-by register, which matches the LSB of the post-sequence, is the bit cell shifted to the left from the LSB of the stand-by register by a predetermined number. In this embodiment, the predetermined number is the order of the pre-sequence bit used to produce the post-sequence concerned. The remaining locations of the stand-by register lower in order than the portion thereof are filled with logical zeros (0's), and those higher in order than the portion are filled with the bits selected by the MUX2, 32, 33, 34. The MUX2s 32, 33, 34 select either logical zero (0) when performing multiplication or logical one (1) when performing division. The contents stored in the stand-by registers 36, 37, 38, 39 are referred to as $S_3$, $S_2$, $S_1$, $S_0$, respectively.

Figure 5A:
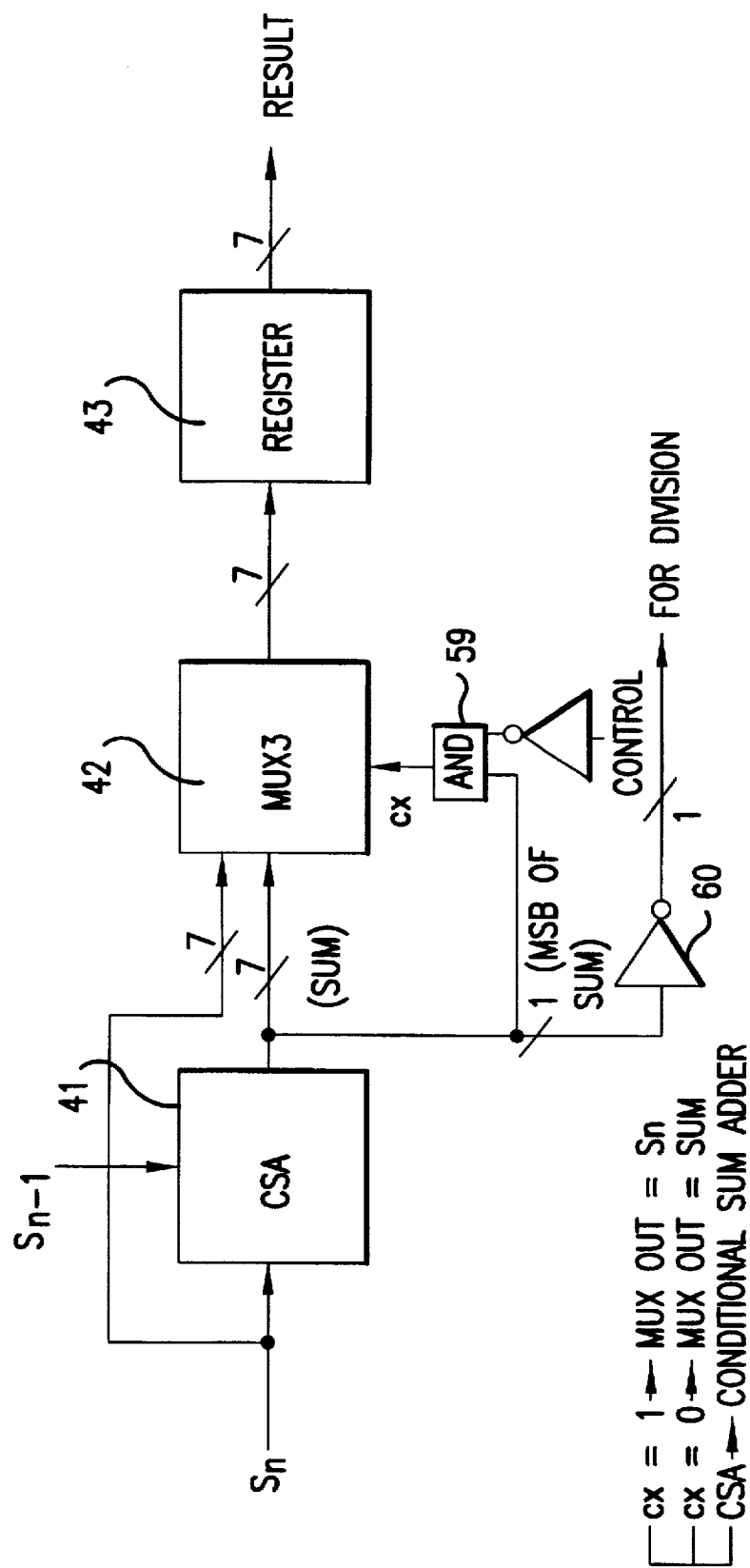
FIG. 5A is an electrical diagram of a functional cell of an arithmetic unit in accordance with the preferred embodiment of the present invention.

FIG. 5A is an electrical diagram of a functional cell of the arithmetic unit 40 in accordance with the preferred embodiment of the present invention. The functional cell composes an M/D (Multiplication/Division) module for the arithmetic unit 40.

The functional cell comprises a CSA (Conditional Sum Adder) 41, a MUX3 42, a register 43, an AND gate 59, and an inverter 60. The CSA 41 performs addition operation between $S_n$ and $S_{n-1}$, and preferably has the least carry ripple delay. The MUX3 42 selects either $S_n$ or the sum of $S_n$ and $S_{n-1}$ depending on the output of AND gate 59, that is, depending on control input from the control unit 70 and the sign of the sum of $S_n$ and $S_{n-1}$. The register 43 latches the selection output of MUX3 42. The inverter 60 inverts the MSB of the sum of $S_n$ and $S_{n-1}$ to produce a bit for division output, and the AND gate 59 performs logical AND between the MSB of the sum and inverted control input to produce a signal for controlling the selection of MUX3 42.

When performing multiplication, MUX3 42 always selects the sum of $S_n$ and $S_{n-1}$ due to the control input from the control unit 70, and the sum is stored in a register 43, whereas when performing division, MUX3 42 selects $S_n$ when the sum of $S_n$ and $S_{n-1}$ is negative, and selects $S_n+S_{n-1}$ when the sum is non-negative. When performing division, the arithmetic operation done by the CSA 41 has the meaning of subtraction because of manipulations done by the sign modifiers 21, 22 and MUX's 31, 32, 33, 34. When the sum by CSA 14 is negative, the MUX3 42 selects $S_n$ and the bit for division is logical zero (0). However, when the sum is non-negative, the MUX3 42 selects the sum of $S_n$ and $S_{n-1}$, and the bit for division is logical one (1).

Figure 5B:
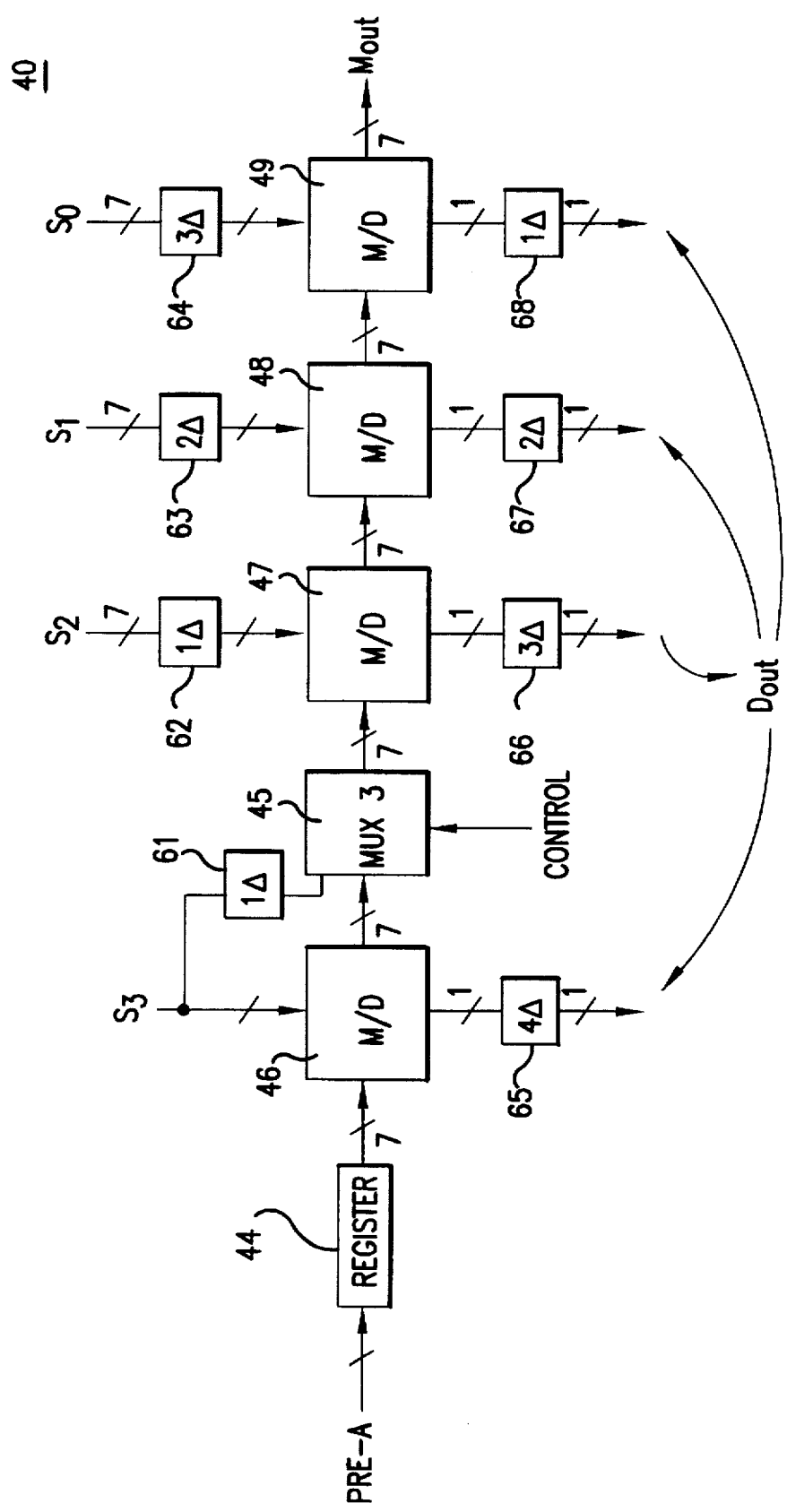
FIG. 5B is an electrical diagram of an arithmetic unit with pipeline structure in accordance with the preferred embodiment of the present invention.

FIG. 5B is an electrical block diagram of the arithmetic unit 40 with the pipeline structure in accordance with the preferred embodiment of the present invention. The arithmetic unit 40 comprises an input register 44 for storing the pre-A from the first sign modifier 21, a multiplexer 45 for switching depending on the operation being performed, a plurality of M/D modules 46, 47, 48, 49 for performing operations as described above, a first group of delay units 61, 62, 63, 64 for fitting the timing of input bits, and a second group of delay units 65, 66, 67, 68 for fitting the timing of output bits.

When performing multiplication, since MUX3 45 selects $S_3$ delayed by one unit of time, three (3) M/D modules 47, 48, 49 are used to produce the Mout from the $S_3$, $S_2$, $S_1$, and $S_0$. On the other hand, when performing division, since MUX3 45 selects pre-A+$S_3$ from the M/D module 46, four (4) M/D modules 46, 47, 48, 49 are used to produce the Dout from the $S_3$, $S_2$, $S_1$, $S_0$ and pre-A.

Figure 6A:
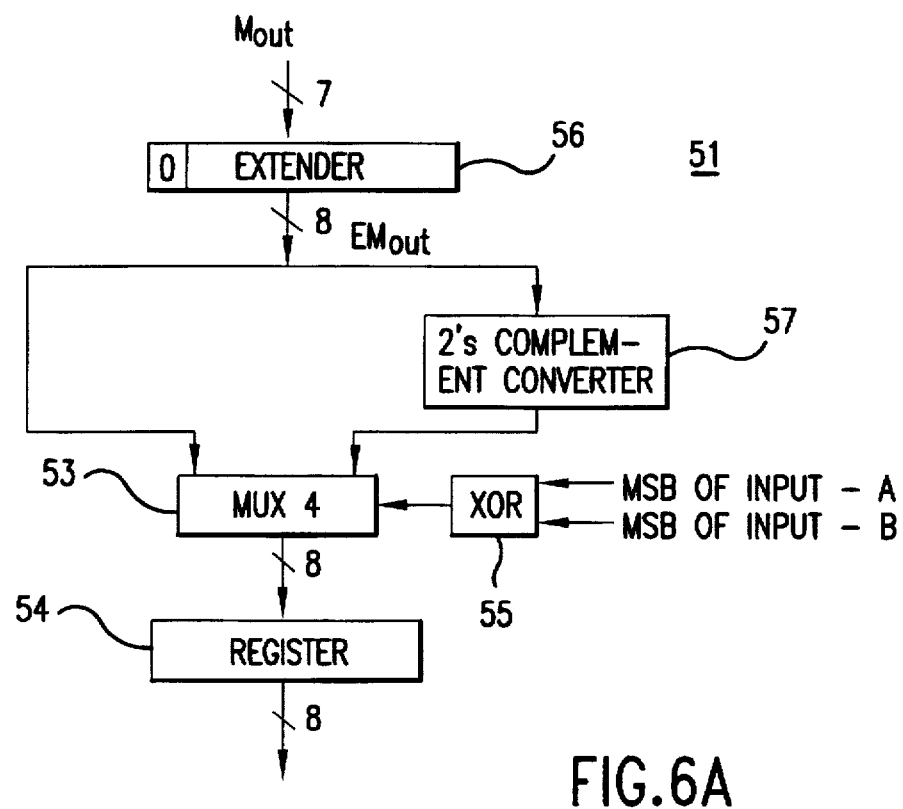
FIGS. 6A–6B are schematic representations illustrating a third and a fourth sign modifiers included in a post-processing unit in accordance with the preferred embodiment of the present invention.
Figure 6B:
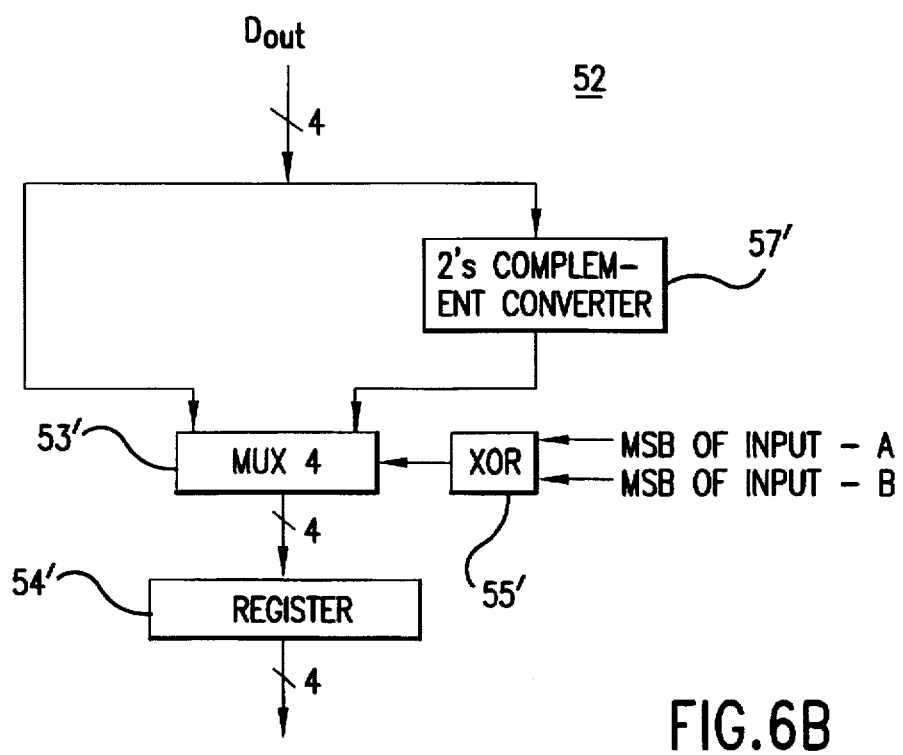

According to an embodiment of the invention, the post-processing unit 50 comprises a third sign modifier 51 and a fourth sign modifier 52 for modifying the signs of the Mout and Dout from the arithmetic unit 40, respectively. The third sign modifier 51 and the fourth sign modifier 52 are illustrated in FIGS. 6A and 6B, respectively.

The operations of the third sign modifier 51 will be described with reference to FIG. 6A.

The third sign modifier 51 comprises a extender 56 for extending bits for Mout to produce an EMout, a two's complement converter 57 for converting the EMout into its two's complement, a MUX4 53 for switching, an EOR 55 for performing exclusive-OR between MSBs of Input-A and Input-B, and a register 54 for latching the selection output of the MUX4 53. The extender 56 extends the Mout to produce EMout by attaching a bit of logical zero (0) to the left of the MSB of the Mout. Due to the extension, the EMout is guaranteed to be non-negative. The MUX4 53 selects either EMout of its two's complement depending on the signs of the two inputs Input-A, Input-B. The MUX4 53 selects the two's complement of EMout when the output of EOR 55 is logical one (1), that is, when only one of Input-A and Input-B is negative. The register 54 latches the output of the third sign modifier 51, and hence stores the result of the multiplication operation between the two inputs Input-A, Input-B.

The operations of the fourth sign modifier 52 will be described with reference to FIG. 6B.

The fourth sign modifier 52 comprises a two's complement converter 57' for converting the Dout into its two's complement, a MUX4 53' for switching, an EOR 55' for performing exclusive-OR between MSBs of Input-A and Input-B, and a register 54' for latching the selection output of the MUX4 53'. The MUX4 53' selects either Dout or its two's complement depending on the signs of the two inputs Input-A, Input-B. The MUX4 53' selects the two's complement of Dout when only one of Input-A and Input-B is negative. The register 54' stores the result of division operation between the two inputs Input-A, Input-B.

The sign modifications by the third and fourth sign modifiers 51, 52 are performed depending on the initial signs of the inputs Input-A, Input-B. Since the Mout and Dout are always positive due to the pre-processing, when only one of the inputs Input-A, Input-B is negative, the Mout and Dout are converted to their two's complement.

Now, the operation of the processor 10 in the preferred embodiment when performing multiplication will be described with reference to the drawings.

In Multiplication

When the processor 10 performs multiplication of two inputs Input-A, Input-B, it first converts the inputs into their positive values if they are negative in the pre-processing unit 20. Then, the processor 10 performs predetermined arithmetic operations including shiftings, additions and time delays in the arithmetic unit 40, and the signs of the arithmetic result are adequately modified.

The two inputs Input-A, Input-B, which are expressed in 4 bits in this embodiment, are provided to the pre-processing unit 20. The pre-processing unit 20 includes a first sign modifier 21 (FIG. 3A) and a second sign modifier 22 (FIG. 3B). The first sign modifier 21 insures pre-A' and pre-A to be non-negative by converting Input-A to its two's complement if it is negative. MUX1 25 selects Input-A or its two's complement depending on the MSB of the Input-A. Similarly, the second sign modifier 22 insures pre-B non-negative. Since MUX2 28 selects MSB of Input-B by the control input from the control unit 70, MUX1 27 selects Input-B or its two's complement depending on the MSB of Input-B.

The MUX1 31 (FIG. 4) selects, as the pre-sequence, the pre-A' by the control input from the control unit 70 such that bits of the pre-A' are respectively supplied to four (4) gate portions 71, 72, 73, 74, and are ANDed with the pre-B to produce post-sequences. Each post-sequence is stored in a corresponding stand-by register in a predetermined aligning order as described above.

When, for example, a $2^1$-order bit in the pre-A' is ANDed with pre-B in the gate portion 73, the post-sequence is stored in the stand-by register 38. Since the bit order is $2^1$, a $2^1$-order bit in the register 38 is selected to match the LSB of the post-sequence. The remaining bits of the post-sequence are stored in the stand-by register 38 in an ordinary way. The LSB of the stand-by register 73 is filled with logical zeros (0's), and the MSB and $2^5$-order bits are filled with the outputs from MUX2 33, i.e. logical zeros (0's). The four (4) post-sequences are stored in the stand-by registers 36, 37, 38, 39. From above process, the aligning unit 30 produces four (4) intermediate data $S_3$, $S_2$, $S_1$, $S_0$. All the intermediate data $S_3$, $S_2$, $S_1$, $S_0$ are guaranteed to be non-negative.

The intermediate data $S_3$, $S_2$, $S_1$, $S_0$ are supplied to the arithmetic unit 40 to produce multiplication result Mout. MUX3 45 (FIG. 5B) selects the $S_3$ such that three (3) M/D modules 47, 48, 49 are cascaded to add the intermediate data $S_3$, $S_2$, $S_1$, $S_0$. Four (4) delay units 61, 62, 63, 64 are adopted when performing multiplication for fitting the timing of operations based on the pipeline structure.

The result Mout is subject to sign modification in the third sign modifier 51 (FIG. 6A) of the post-processing unit 50. The 7-bit Mout is extended to the 8-bit EMout by attaching a logical zero (0) to the left of its MSB. This process ensures that EMout is always non-negative. EOR 55 outputs logical one (1) when only one of Input-A and Input-B is negative. Depending on the output of EOR 55, the MUX4 53 selects the EMout or its two's complement. A register 54 stores the final result of the multiplication of the two inputs Input-A, Input-B performed by the processor 10.

Now, the operation of the processor 10 in the preferred embodiment when performing division will be described with reference to the drawings.

In Division

When the processor 10 performs division of two inputs Input-A, Input-B, its operation is similar to that of multiplication except that it first sign-modifies the inputs so as to ensure that pre-A is always non-negative and pre-B is always negative.

The two inputs Input-A, Input-B are provided to the pre-processing unit 20. The first sign modifier 21 insures pre-A' is non-negative, while the second sign modifier 22 insures pre-B is negative. It is performed in a similar way to that used when performing multiplication.

The MUX1 31 (FIG. 4) selects four (4) bits of logical ones (1's) such that the four (4) bits are respectively supplied to four (4) gate portions 71, 72, 73, 74 as the pre-sequence, and are ANDed with the pre-B to produce four (4) post-sequences. Each post-sequence is stored in a corresponding stand-by register in a predetermined aligning order. In this way, the aligning unit 30 produces four (4) intermediate data $S_3$, $S_2$, $S_1$, $S_0$. All the intermediate data $S_3$, $S_2$, $S_1$, $S_0$ are guaranteed to be negative.

The intermediate data $S_3$, $S_2$, $S_1$, $S_0$ are supplied to the arithmetic unit 40 to produce the division result Dout. The MUX3 45 (FIG. 5B) selects arithmetic result of M/D module 46, such that four M/D modules 46, 47, 48, 49 are cascaded to add the intermediate data $S_3$, $S_2$, $S_1$, $S_0$.

The M/D module 46 adds the pre-A stored in a register 44 and the intermediate data $S_3$. Since the pre-A is non-negative and data $S_3$ is negative, the addition conceptually has the meaning of subtraction. When the result of the addition is non-negative, the Dout bit is logical one (1) and MUX3 42 (FIG. 5A) selects the result of addition. When the result is negative, the Dout bit is logical zero (0) and MUX3 42 selects $S_3$. Other M/D modules 47, 48, 49 operate similarly to produce the Dout. Eight (8) delay units 62, 63, 64, 65, 66, 67, 68 are adopted in division for fitting the timing of operations based on the pipeline structure.

The result Dout is subject to sign modification in the fourth sign modifier 52 (FIG. 6B) of the post-processing unit 50. Sign modification of the Dout is performed such that, when only one of the two inputs Input-A, Input-B is negative, the Dout is converted into the negative. The fourth sign modifier 52 operates similarly with the third sing modifier 51.

Therefore, the processor 10 of the present invention has a processing structure commonly used for multiplication and division, and hence has advantages as described below.

First, the processor 10 easily selects multiplication or division to perform as determined by external control inputs.

Second, the processor 10 operates at high speed by adopting the pipeline structure.

Third, from the above advantages, it can be widely adopted in signal processors which require real time processing and selectively perform multiplication/division.

It may be appreciated by now that there has been provided a processor for selectively performing multiplication or division at high speed based on a pipeline structure.

While the present invention is described in terms of preferred embodiments, it is understood that numerous variations and modifications will occur to a person skilled in the art without departing in spirit from the claimed invention. It is intended that the scope of the claims include those modifications and variations that fall within the spirit of the invention.

What is claimed is:

1. A processor for selectively performing multiplication or division of two inputs, comprising:

pre-processing means for modifying the signs of said inputs;

aligning means for aligning bit positions of said sign-modified inputs;

arithmetic means for selectively performing multiplication or division of said sign-modified and bit-aligned inputs;

post-processing means for modifying the signs of outputs from said arithmetic means; and control means for controlling operations of said pre-processing means, aligning means, arithmetic means, and post-processing means.

2. The processor of claim 1, wherein said pre-processing means comprises:

a first sign modifier for selecting a first input out of said inputs and producing a first predata which is the absolute value of said first input; and a second sign modifier for selecting a second input out of said inputs and producing a second predata which is either the absolute value of said second input when performing multiplication or the negative of absolute value of said second input when performing division, and said control means informing said second sign modifier of the type of operation being performed.

3. The processor of claim 2, wherein said aligning means comprises:

a first multiplexer that selects either said first predata when performing multiplication or a bit sequence of logical ones (1's) when performing division to produce a pre-sequence;

a plurality of gate portions for carrying out logical AND between said second predata and each bit of said pre-sequence respectively, to produce a plurality of post-sequences; and a plurality of stand-by registers for storing said post-sequences in predetermined aligning order, wherein each of said gate portions corresponds to each of said stand-by registers.

4. The processor of claim 3, wherein said aligning means further comprises a plurality of second multiplexers for selecting either logical zero (0) when performing multiplication or logical one (1) when performing division, each of said post-sequences being aligned in the corresponding stand-by register being shifted to the left by the order of the pre-sequence bit used to produce the associated post-sequence, each unfilled bit lower in order than the filled bits of the stand-by registers being filled with logical zero (0), while each unfilled bit higher in order than the filled bits of the stand-by registers being filled with a bit selected by said second multiplexer, and said control means informing said second multiplexer of the type of operation being performed.

5. The processor of claim 3, wherein said arithmetic means comprises:

a series of M/D modules, each having corresponding order and comprising:

a two-input adder having a first terminal and a second terminal for producing the sum of the values supplied in said terminals, wherein said second terminal is supplied with the value stored in the stand-by register corresponding to the associated M/D module, and a third multiplexer for selecting either said sum when performing multiplication, or one of said sum and the value in said first terminal depending on the sign of said sum when performing division, wherein the highest in order M/D module is provided with said first predata and the value stored in the stand-by register associated with the MSB of said pre-sequence, and operation result of an M/D module except the highest in order M/D module is provided to the first terminal of said two-input adder of next lower in order M/D module;

a plurality of delay means for delaying inputs and outputs of said series of M/D modules for predetermined time periods; and a fourth multiplexer for selecting either the output of said highest in order M/D module when performing multiplication or value stored in the stand-by register associated with the MSB of said pre-sequence when performing division and providing said selected output to the first terminal of the adder of the secondly highest in order M/D module.

6. The processor of any one of claims 1–5, wherein said post-processing means comprises two sign modifiers for modifying the signs of the outputs from said arithmetic means depending on the signs of said plurality of inputs.

* * * * *